United States Patent
Graefenhain

(10) Patent No.: US 6,890,082 B2
(45) Date of Patent: May 10, 2005

(54) PRECISION-MOUNTED TILTING MIRROR FOR OPTICAL DEVICES

(75) Inventor: Paul Graefenhain, Balgeh (CH)

(73) Assignee: Leica Microsystems AG, Heerbrugg (CH)

(*) Notice: Subject to any disclaimer, the term of this patent is extended or adjusted under 35 U.S.C. 154(b) by 0 days.

(21) Appl. No.: 10/171,387

(22) Filed: Jun. 14, 2002

(65) Prior Publication Data

US 2003/0011862 A1 Jan. 16, 2003

(30) Foreign Application Priority Data

Jun. 15, 2001 (DE) .......................... 101 28 965

(51) Int. Cl.⁷ .............................................. G02B 7/182
(52) U.S. Cl. ...................................................... 359/872
(58) Field of Search ...................... 248/479; 359/234, 359/223, 224, 225, 226, 872, 499

(56) References Cited

U.S. PATENT DOCUMENTS 4,174,159 A    11/1979   Kraft et al.
5,134,515 A *  7/1992   Papritz et al. ............. 359/223

FOREIGN PATENT DOCUMENTS

DE   2 029 850       4/1972
DE   2 341 038       2/1974
DE   27 17 033 A1    10/1978

* cited by examiner

*Primary Examiner*—Euncha P. Cherry
(74) *Attorney, Agent, or Firm*—Foley & Lardner LLP

(57) ABSTRACT

A tilting mirror for optical devices is described, in particular microscopes, which is retained in precision-mounted fashion in a carrier in a working position. For that purpose, the carrier has a three-surface support.

31 Claims, 3 Drawing Sheets

PRECISION-MOUNTED TILTING MIRROR FOR OPTICAL DEVICES

CROSS REFERENCE TO RELATED APPLICATIONS

The inventor claims priority of the German patent application 101 28 965.0 filed on Jun. 15, 2001, which is incorporated by reference herein in its entirety.

BACKGROUND OF THE INVENTION

The invention relates generally to the field of optical beam deflection in an optical device, and more particularly, to a tilting mirror for selectable switching into and out of an optical beam path of an optical device.

Arrangements are known in which a mirror is tilted in order to direct a beam on different paths through a multi-functional optical device. With a tilting mirror in a microscope, for example, the radiation proceeding from the specimen can be conveyed selectably to the observer's eye or to a documentation medium. If a mirror switches between only two light paths, then arrangements are selected, for example, in which in the one position the mirror is arranged in the beam path in order to deflect the light (working position), and in the second position is placed outside the light path. Such arrangements require high angular accuracy and reproducibility in terms of the mirror location in the working position.

DE Patent 2,029,850, for example, teaches a photometer for microscopes in which a reciprocating magnet brings about the pivoting into and out of the beam path.

Another DE Unexamined Application 2,341,038 teaches a tilting mirror in the 45° position, which in that position blocks the vertical imaging beam path in a macro microscope and reflects into the eyepiece system a reflected-in beam path arranged at right angles thereto.

DE Unexamined Application teaches a microphotographic light measurement device in which a deflection mirror can be introduced into an optical beam path in such a way that the deflection mirror is slid into the working position by means of a manually actuable carrier.

Also known are solutions in which a pivotable holder is mounted on a mechanical tilting shaft which receives the mirror on its back side or side surface. Accurate angular deflection is defined by the arrangement of the tilting shaft and by contact of the mirror or the holder against a stop. The stop and/or the tilting shaft are configured alignably so that the most accurate possible angular deflection can be set even for different mirror thicknesses and manufacturing tolerances. To ensure that the tilting mirror can return to its original angular position after each tilt, stringent requirements are therefore placed on the bearing of the tilting shaft; in addition, the mirror position in the working position must be aligned.

SUMMARY OF THE INVENTION

It is therefore an object of the present invention to eliminate the aforesaid disadvantages of known designs and/or other problems found within the prior art, and to present a precision-mounted tilting mirror arrangement that can be produced economically and can be used in a wide variety of optical devices.

This object is achieved by a tilting mirror having a mount for selectable deflection or passage of a beam in an optical device wherein the tilting mirror is arranged on a carrier that comprises a three-surface support for precision mounting of the tilting mirror in the working position.

According to one aspect of the present invention, a tilting mirror having a mount for selectably deflecting or allowing passage of a beam in an optical device is provided, the tilting mirror being arranged on a carrier comprising at least a three surface support for precision mounting of the tilting mirror in a working position.

According to another aspect of the present invention, an optical alignment device is provided comprising a carrier member including a plurality of deflector supports projecting from a top surface, and a rotatable deflector coupled to the carrier member in such a way as to engage the plurality of deflector supports when positioned in a working position.

According to another aspect of the present invention, a method of deflecting beams in an optical device is provided comprising rotating a mirror from a propagation position to a working position, and supporting the mirror in the working position via a plurality of mirror supports on a carrier member.

According to another aspect of the present invention, an optical alignment device is provided comprising a carrier member including a plurality of deflector supports projecting from a top surface and lying substantially in the same plane, a rotatable deflector coupled to the carrier member in such a way as to engage the plurality of deflector supports when positioned in a working position, and at least one cylinder about which the rotatable deflector rotates.

Advantages of this tilting mirror according to the present invention include the aspect that only one plane, constituted by three precision-machined surface elements, is necessary for high positioning accuracy and reproducibility, and that alignment of the functional position is superfluous. A specially configured mechanical tilting shaft and a precise bearing system for such a shaft are not necessary. The demands in terms of design placed on the mechanism—i.e. on the stop geometry for limiting any lateral motions of the mirror—are not great.

BRIEF DESCRIPTION OF THE DRAWINGS

The invention will now be described with reference to the Figures.

FIG. 1b is a block diagram of a carrier belonging to the tilting mirror shown in FIG. 1a;

DETAILED DESCRIPTION OF THE INVENTION

Reference will now be made in detail to exemplary embodiments of the invention. Wherever possible, the same reference numbers will be used throughout the drawings to refer to the same or like parts.

Figure 1A:
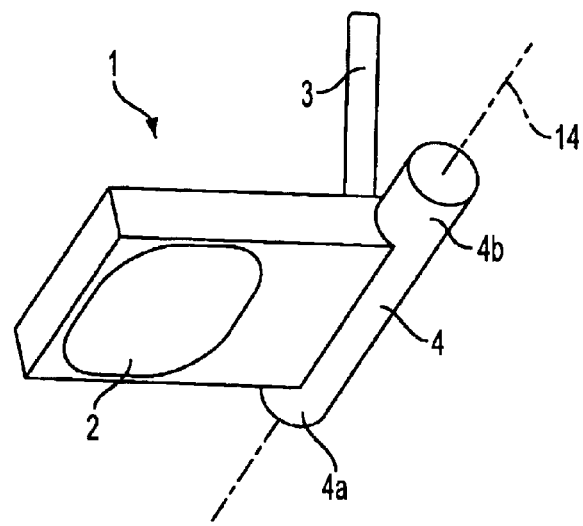
FIG. 1a is a block diagram of a tilting mirror according to an embodiment of the present invention.

FIG. 1a shows a tilting mirror 1 that has on its underside a mirror-like reflective region 2. Located at its end region is a cylindrical part 4 whose axis coincides with tilt axis 14 of tilting mirror 1. It is evident that cylindrical part 4 is "extended"on either side of tilting mirror 1, thereby forming projections 4a and 4b. Cylindrical part 4 can be a separate piece apart from and added to tilting mirror 1, or can be integrally formed with tilting mirror 1. This tilting mirror can be pivoted or tilted about its axis 14 with, for example, a manually actuable lever 3.

Figure 1B:
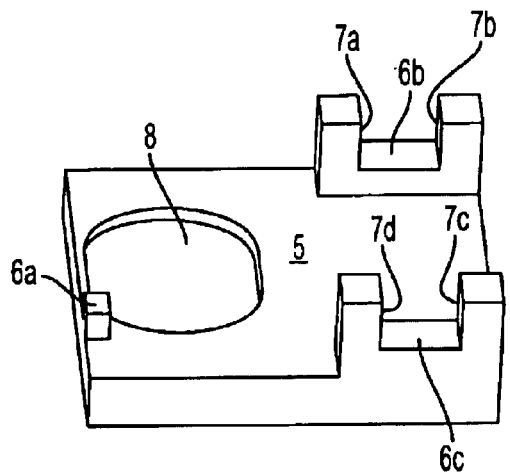

This tilting mirror arrangement corresponds to carrier 5 depicted in FIG. 1b, which is configured as a plate that has an opening 8 for the incident beam that is reflected or allowed to pass. Also evident are precision surface elements 6a–6c, surface elements 6b and 6c constituting precision support surfaces for projections 4a and 4b, respectively, of cylindrical part 4. Located at the other edge region of carrier 5 is a precision stop surface 6a, the design being executed in such a way that surfaces 6a and 6b and 6c together implement a "three-surface support"6a–6c for tilting mirror 1. To protect the tilting mirror from unintentional lateral offsetting, support surfaces 7a–7d are located in a right-angled arrangement with respect to precision support surfaces 6b and 6c.

Figure 2:
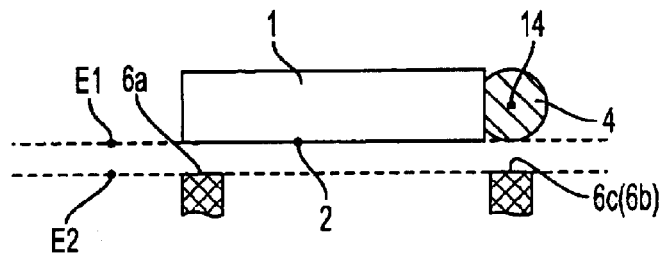
FIG. 2 is an "exploded" side view of a tilting mirror in a working position according to an embodiment of the present invention.

FIG. 2 depicts a working position of tilting mirror 1 in an exploded view. It is evident that the underside of tilting mirror 1 having reflective region 2 lies on a fictitious plane E1, and cylindrical part 4 and its projections 4a and 4balso lie on plane E1. In mathematical terms, this means that the extension of fictitious plane E1 tangentially touches the circular cross section of cylindrical part 4. This configuration can be achieved in precise fashion with a single production operation. For example, cylindrical part 4 and tilting mirror 1, resting on a common support, can be immovably joined to one another. This can be done, for example, by adhesive bonding, cementing, or welding. On the other hand it would also be possible to configure tilting mirror 1 in one piece together with cylindrical part 4, the underside of the tilting mirror being removed in plane-parallel fashion, for example by precision material-removing machining or injection molding, until the two parts (1 and 4) come to rest on fictitious plane E1. FIG. 2 shows the columnar precision stop surface 6a and precision surface element 6c, which conceals the associated surface element 6b. It is evident that the surfaces of precision surface elements 6a–6c also lie in one fictitious plane E2. As already mentioned, in the working position of the tilting mirror these two fictitious planes E1 and E2 coincide, so that E1≡E2.

Figure 3A:
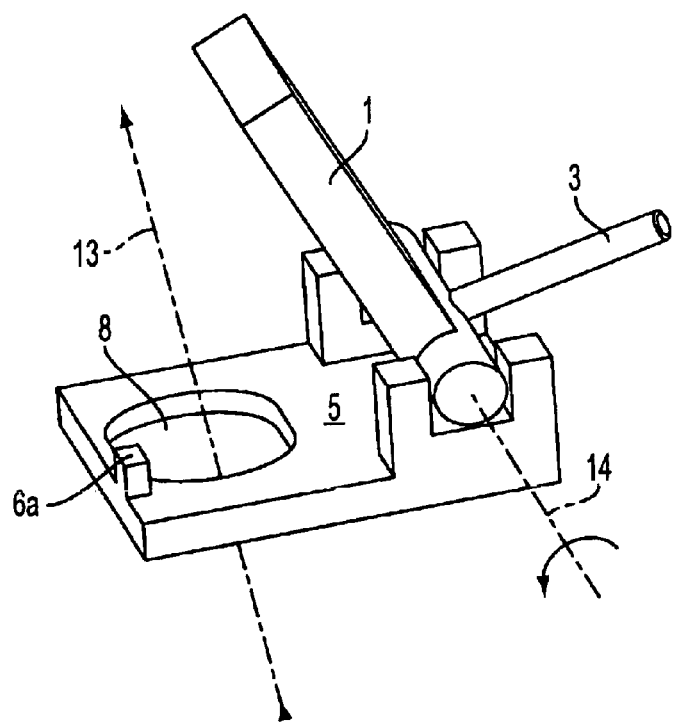
FIG. 3a is a block diagram of a tilting mirror with associated carrier out of the working position according to an embodiment of the present invention.

FIG. 3a shows tilting mirror 1 together with its carrier 5 in a non-working position, so that beam 13 can pass unimpeded through opening 8.

Figure 3B:
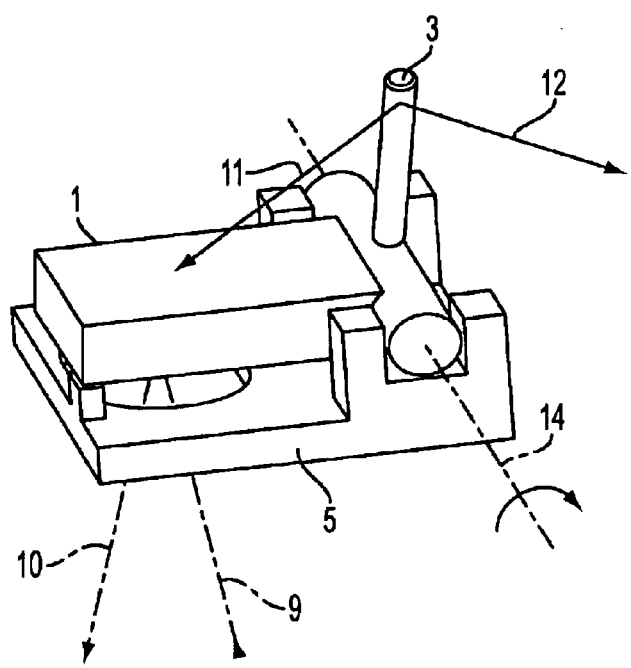
FIG. 3b is a block diagram of a tilting mirror resting precisely at or on a carrier in the working position according to an embodiment of the present invention.

In FIG. 3b, tilting mirror 1 is in the working position, so that incident beam 9 is reflected at reflective region 2 and is deflected as reflected beam 10. The Figure shows in purely schematic fashion that a force vector 11 acts on lever 3 and brings about the precise tilting of tilting mirror 1. The force presses against the three surface elements 6a–6c. To switch tilting mirror 1 out, what acts instead of the force 11 is a counterforce 12 (the corresponding force vector 12) whose direction of action lies well outside the supporting triangle formed by surfaces 6a through 6c. In order to switch in and maintain the working position of tilting mirror 1, a force is exerted on lever 3 such that vector 11 intersects the support plane of tilting mirror 1 inside the three support points or support surfaces 6a–6c. If tilting mirror 1 is to be moved out of its working position (as depicted in FIG. 3a), the direction of action of the force is modified in such a way that its vector 12 intersects the supporting plane well outside the triangle formed by the three aforesaid points or surfaces 6a–6c. As a result, tilting mirror 1 is moved away from the supporting three-surface plane; advantageously, the travel relative to two of the three regions to be supported is limited, so that the tilting mirror executes a kind of rolling or tilting motion. Any lateral displacement that occurs in this context in some circumstances is not detrimental in terms of function, and is effectively limited by suitable means, for example lateral projections or recesses on the tilting mirror and stop surfaces opposite them on the carrier part.

Figure 4A:
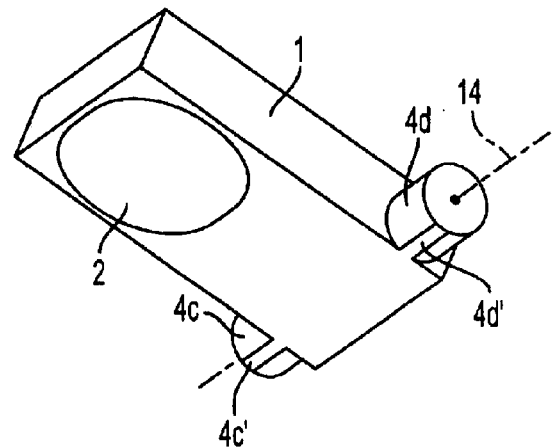
FIG. 4a is a block diagram of a tilting mirror according to an embodiment of the present invention.
Figure 4B:
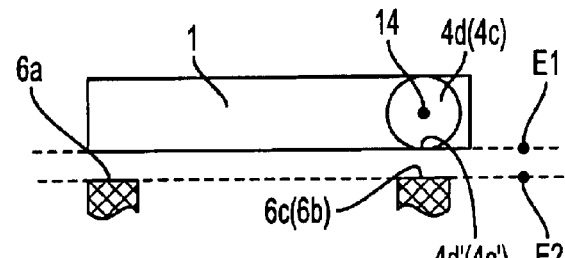
FIG. 4b is an "exploded" side view of the tilting mirror shown in FIG. 4a with a carrier part indicated according to an embodiment of the present invention.

FIG. 4a depicts a minor variation of tilting mirror 1, or more precisely a variation of the projections of cylindrical part 4. It is evident that cylindrical extensions 4c and 4d have flattened areas 4c'and 4d'. These flattened areas lie in coplanar fashion in plane E1 together with the underside of tilting mirror 1. This is illustrated in FIG. 4b. This variant of the tilting mirror design has the advantage in terms of production engineering that plane E1 can be created with a single material-removing precision machining operation. Flattened regions 4c' and 4d'merely represent narrow "lands", so as not to impair the translational or tilting or rolling operation in a manner untypical of the motion.

Figure 5A:
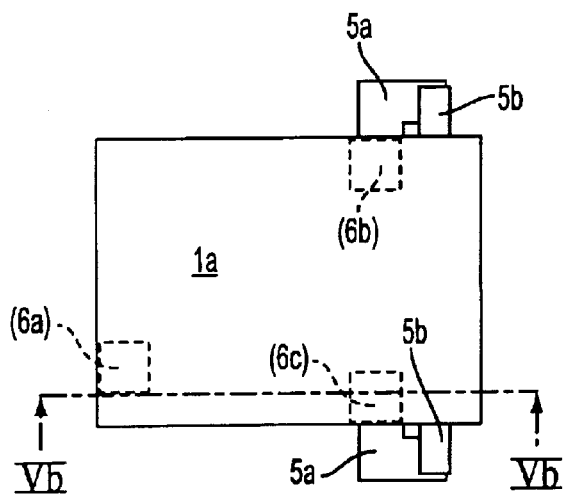
FIG. 5a is a plan view of a tilting mirror with a carrier located below it according to an embodiment of the present invention.
Figure 5B:
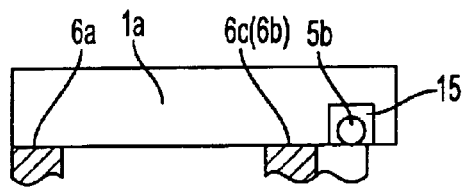
FIG. 5b is a side view of the tilting mirror shown in FIG. 5a with the carrier part resting precisely in the three-surface support according to an embodiment of the present invention.

FIGS. 5a and 5b depict a further embodiment of a tilting mirror 1a and of the corresponding carrier. FIG. 5a shows tilting mirror 1a in a plan view, while the actual principal portion of the carrier located below it is not visible. Instead, carrier parts 5a are pivot-mounted on either side onto the actual carrier. It is evident that these are angled arm-shaped carrier parts 5a that carry a cylindrical stop and roller element 5b at or on each of their end regions. This can be one continuous cylindrical element. It is also possible to provide two cylindrical sub-elements instead of one integral cylindrical element 5b.

FIG. 5b is a side view along section $\overline{Vb\text{—}Vb}$ of FIG. 5a. It is evident that tilting mirror has in its end region a recess 15 that can be designed, for example, as a continuous groove. This groove receives stop and roller element or elements 5b. FIG. 5b shows that in the working position, tilting mirror 1a is positioned so that the upper part of recess 15 does not contact element(s) 5b. This therefore ensures that tilting mirror 1a rests precisely only at or on a three-surface support 6a–6c. The function of cylindrical element 5b is to serve as a stop and roller element as tilting mirror 1a is brought out of the working position. The cross-sectional shape of recess 15 can exhibit a number of variants. In this variant embodiment of tilting mirror 1a, precision support surfaces 6b and 6c are configured in such a way that they are rounded off on their portion facing toward stop and roller element 5b. This improves the combined translational, tilting, and rolling operation of tilting mirror 1a.

It is of course also possible to provide a number of further variants for the tilting of tilting mirror 1a. For example, it would be conceivable for the tilting mirror to have, instead of a continuous recess, merely two blind holes in its rear region, into which corresponding pegs (i.e. cylindrical parts) of carrier 5 engage.

It is also possible for the actual carrier 5 and carrier parts 5a and 5b to be configured integrally.

Suitable materials for the tilting mirror with integrated cylindrical parts 4, 4c, 4d, 4c', and 4d' and for tilting mirror 1a and/or for carrier 5 inclusive of carrier parts 5a and 5b are glass, glass ceramic, or ceramic material.

The advantages of the present invention are that only one plane (E1≡E2) constituted by three precision-machined surface elements is required for high positioning accuracy and reproducibility, and that subsequent alignment of the functional position is superfluous. A specially configured mechanical tilting shaft and a precise bearing system for such a shaft are not necessary. No substantial design demands are required on the mechanism (i.e. the stop geometries) in order to limit any lateral motions of the tilting mirror.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

| FIGURE LABELS | |
|---|---|
| 1, 1a | Tilting mirror |
| 2 | Reflective region of (1), (1a) |
| 3 | Lever |
| 4 | Cylindrical part of (1) |
| 4a, 4b | Projections of (4) |
| 4c, 4d | Cylindrical extensions on (1) |
| 4c', 4d' | Flattened region(s) of (4c), (4d) |
| 5 | Carrier for (1) |
| 5a, 5b | Carrier part(s) for (1a) |
| 5a | Angled arm-shaped carrier part(s) for (5b) |
| 5b | Cylindrical stop and roller elements for (1a) |
| 6a–6c | Precision surface element(s) |
| 6a | Precision stop surface |
| 6b, 6c | Precision support surface(s) |
| 7a–7d | Support surface(s) |
| 8 | Opening for beam path (9), (13) |
| 9 | Incident beam |
| 10 | Reflected beam |
| 11 | Force vector (bringing into working position) |
| 12 | Force vector (bringing out of working position) |
| 13 | Beam passing through |
| 14 | Tilt axis |
| 15 | Recess in (1a) for precise execution of tilting motion of (1a) |
| E1 | Common plane of (2) and (4), (4c', 4d') |
| E2 | Common plane of (6a), (6b), and (6c) |

What is claimed is:

1. A tilting mirror arrangement for selectably deflecting or allowing passage of a beam in an optical device, comprising:
   a tilting mirror; and
   a carrier,
   wherein said tilting mirror is configured to be arranged on the carrier,
   wherein the carrier comprises at least a three surface support for precision mounting of the tilting mirror in a working position, and
   wherein the three surface support is in contact with a plane of a reflective region of the tilting mirror when said tilting mirror is in said working position.

2. The tilting mirror arrangement as defined in claim 1, wherein said reflective region is located on one side of the tilting mirror, and the tilting mirror comprises a cylindrical end region defining a tilt axis about which said tilting mirror rotates.

3. The tilting mirror arrangement as defined in claim 2, wherein the cylindrical end region comprises projections along said tilt axis.

4. The tilting mirror arrangement as defined in claim 2, further comprising at least one recess formed on said side in said cylindrical end region.

5. The tilting mirror arrangement as defined in claim 4, wherein the cross section of the recess has the shape of one of a square, a rectangle, a trapezoid, and a triangle.

6. The tilting mirror arrangement as defined in claim 2, wherein the carrier further comprises precision surfaces adapted to receive said cylindrical end region, and a precision surface for stopping said tilting mirror in said working position.

7. The tilting mirror arrangement as defined in claim 1, wherein the carrier further comprises two carrier parts, each of said carrier parts including a continuous cylindrical stop and rolling element immovably arranged on end regions for tilting said tilting mirror.

8. The tilting mirror arrangement as defined in claim 7, wherein the carrier parts are of an angular configuration comprising arms formed on said carrier.

9. The tilting mirror arrangement as defined in claim 7, wherein one cylindrical stop and rolling element is immovably arranged on each carrier part.

10. The tilting mirror arrangement as defined in claim 6, wherein the precision surfaces are rounded off in their respective regions facing toward the tilt axis.

11. The tilting mirror arrangement as defined in claim 3, wherein said carrier further comprises support surfaces for said projections.

12. The tilting mirror arrangement as defined in claim 11, wherein the support surfaces run substantially perpendicular to precision surfaces adapted to receive said cylindrical end region.

13. The tilting mirror arrangement as defined in claim 2, wherein the tilting mirror and cylindrical end region are integrally formed as one part.

14. The tilting mirror arrangement as defined in claim 6, wherein the tilting mirror and the cylindrical end region lie along a common plane, and wherein the precision surfaces lie along a common plane, the two planes being substantially coincident in the working position of the tilting mirror.

15. The tilting mirror arrangement as defined in claim 2, wherein the cylindrical end region and the tilting mirror are joined to one another by one of adhesive bonding, cementing, and welding.

16. The tilting mirror arrangement as defined in claim 1, wherein the carrier has an opening for the passage of beams with optical axes, the size of the opening corresponding to the area of the reflective region on said one side of said tilting mirror.

17. The tilting mirror arrangement as defined in claim 2, further comprising a motor arranged within said cylindrical end region for tilting said tilting mirror.

18. The tilting mirror arrangement as defined in claim 2, further comprising an actuation lever arranged on said cylindrical end region for tilting said tilting mirror.

19. The tilting mirror arrangement as defined in claim 2, wherein the tilting mirror, the cylindrical end region, and the carrier are formed from the same material.

20. The tilting mirror arrangement as defined in claim 19, wherein the material is one of glass, ceramic, and glass-ceramic.

21. The tilting mirror arrangement as defined in claim 1, wherein a non-plane surface implementing a stop point is provided on said carrier.

22. An optical alignment device, comprising:

a carrier member including a plurality of deflector supports projecting from a top surface; and a rotatable deflector coupled to said carrier member in such a way as to engage said plurality of deflector supports when positioned in a working position, wherein said deflector supports are in contact with a plane of a reflective surface of said deflector when in said working position.

23. The optical alignment device as defined in claim 22, wherein the reflective surface is formed on one side of said rotatable deflector.

24. The optical alignment device as defined in claim 22, wherein said rotatable deflector comprises an axle portion projecting from said rotatable deflector, said rotatable deflector being rotatable about said axle portion.

25. The optical alignment device as defined in claim 22, further comprising a motor positioned within an axle for rotating said rotatable deflector.

26. A method of deflecting beams in an optical device, comprising:

rotating a mirror from a propagation position to a working position; and supporting said mirror in said working position via a plurality of mirror supports on a carrier member so that a plane of a reflective surface of said mirror is in contact with said mirror supports.

27. The method of claim 26, wherein said rotating step is performed by a motor positioned within an axle on said mirror.

28. The method of claim 26, wherein said mirror is rotatable through an angle less than about 90°.

29. An optical alignment device, comprising:

a carrier member including a plurality of deflector supports projecting from a top surface and lying substantially in the same plane;

a rotatable deflector coupled to said carrier member in such a way as to engage said plurality of deflector supports when positioned in a working position; and at least one cylinder about which the rotatable deflector rotates, wherein a plane of a reflective surface of said deflector is in contact with said deflector supports when in said working position.

30. The tilting mirror arrangement as defined in claim 1, wherein said three surface support comprises three substantially flat surfaces.

31. The tilting mirror arrangement as defined in claim 1, wherein said reflective region is located on one side of the tilting mirror, and wherein said arrangement is configured so that said three surface support is located on said side of the tilting mirror.

\* \* \* \* \*